June 8, 1954 C. E. LOMAX 2,680,780

COMBINATION TOLL AND LOCAL PARTY LINE CONNECTOR USING A SEQUENCE SWITCH

Filed Jan. 17, 1951 2 Sheets-Sheet 1

INVENTOR.
CLARENCE E. LOMAX

BY

Chas. W. Candy

ATTORNEY

June 8, 1954

C. E. LOMAX
COMBINATION TOLL AND LOCAL PARTY LINE CONNECTOR USING A SEQUENCE SWITCH 2,680,780

Filed Jan. 17, 1951

2 Sheets-Sheet 2

INVENTOR.
CLARENCE E. LOMAX
BY
Chas. W. Candy
ATTORNEY

Patented June 8, 1954

2,680,780

UNITED STATES PATENT OFFICE 2,680,780

COMBINATION TOLL AND LOCAL PARTY LINE CONNECTOR USING A SEQUENCE SWITCH

Clarence E. Lomax, Chicago, Ill., assignor to Automatic Electric Laboratories, Inc., Chicago, Ill., a corporation of Delaware Application January 17, 1951, Serial No. 206,375

7 Claims. (Cl. 179—17)

Figure 1:
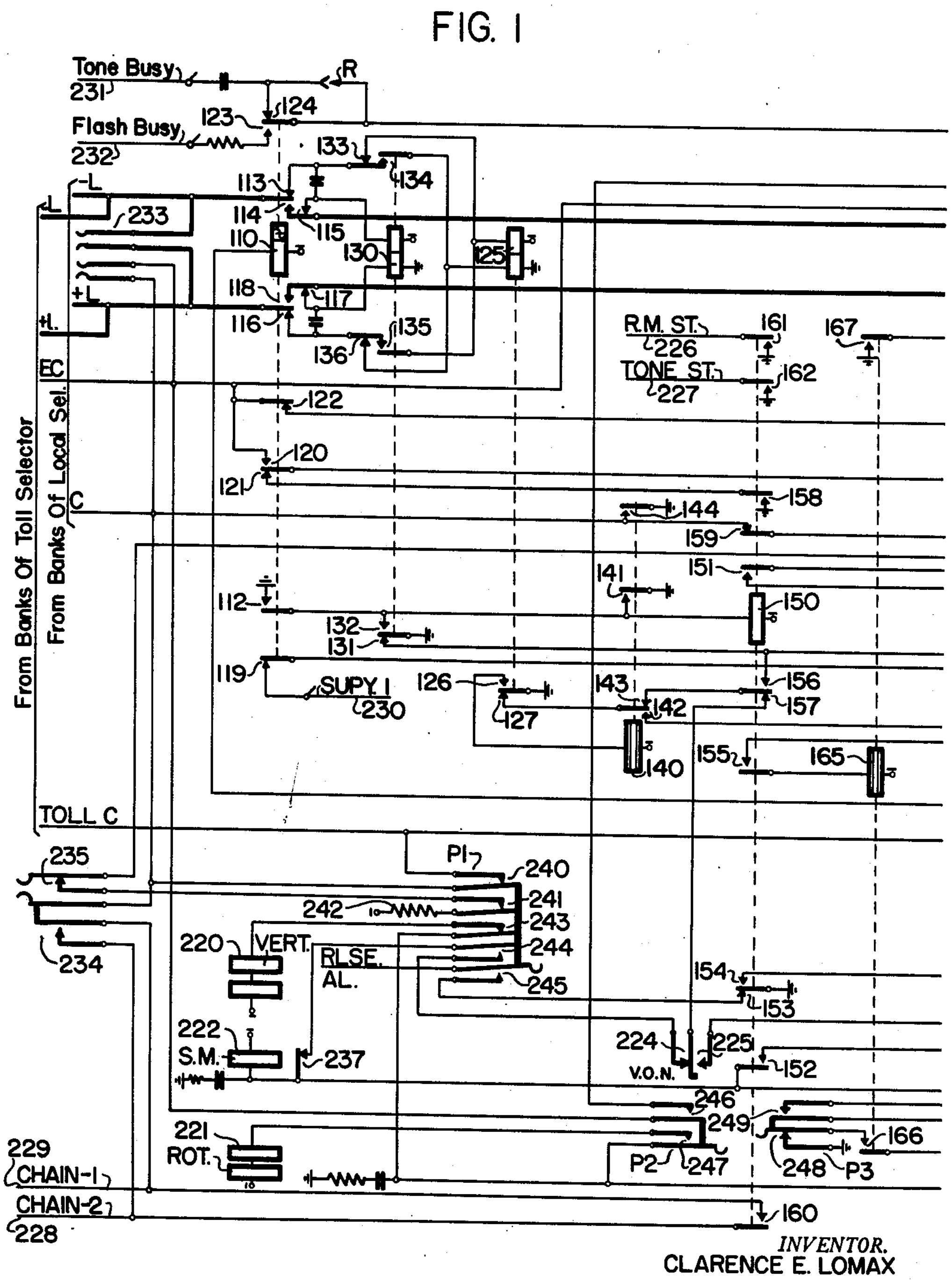

This invention relates in general to telephone systems and more particularly to telephone systems which utilize sequence switches in place of relays to perform the necessary circuit operations.

One object of the invention is to provide a telephone switch circuit which may be used in establishing two different types of telephone connections in which a sequence switch is provided and is used to help to indicate to the circuit the type of connection being made.

Another object of the invention is to provide a combination local and toll connector circuit employing a sequence switch for use in performing various circuit functions and also for use in distinguishing between a call from a local subscriber and a toll selector.

Still another object is to provide a combination local and toll connector circuit for use in establishing connection with party lines, the connector circuit employing a sequence switch to progressively control operations of the connector in the various stages of setting up a connection, to act as a selecting mechanism in selecting the proper ringing signal and the side of the called line to ring over, and to help in distinguishing between a call from a local subscriber and a toll operator.

Another object of this invention is to provide a connector circuit using a sequence switch first as a sequence switch and then as a selecting device responsive to dial impulses, and a means for preventing the sequence switch from operating in response to continued dialling by the calling party after the called line has been found busy.

A feature of this invention is the provision of a connector circuit which has a sequence switch and which uses the same guarding relay for all dialed digits, a slave relay which operates from this guarding relay to operate the sequence switch and a means whereby, even though the guarding relay responds to all the dialed digits, the slave relay responds to only certain of the digits so that if a busy line is called the slave relay cannot be caused to operate from repeated dialing without first releasing the connection and again dialing the entire number.

Another feature of this invention is the provision of a party line connector employing a sequence switch which doubles as a code selector, the connector circuit having a guarding relay operated for all digits and a slave relay for the guard relay operated only on certain digits and not on others, the operation of said slave relay causing operation of said sequence switch as a sequence switch and the release of said slave relay causing a seizure of the called line circuit, the sequence switch causing the disabling of the slave relay on said other digits.

Another feature of this invention is the provision of a connector switch circuit employing a sequence switch mechanism and having a single alarm circuit for supervising the release of both the connector switch and the sequence switch mechanisms, the mechanisms being restored in tandem and thus resulting in a long closure of the alarm circuit.

The invention will appear more clearly, and further objects will become apparent, from the following detailed description when taken in connection with the accompanying drawings, showing by way of example, a preferred embodiment of the inventive idea.

Figures 1A, 3:
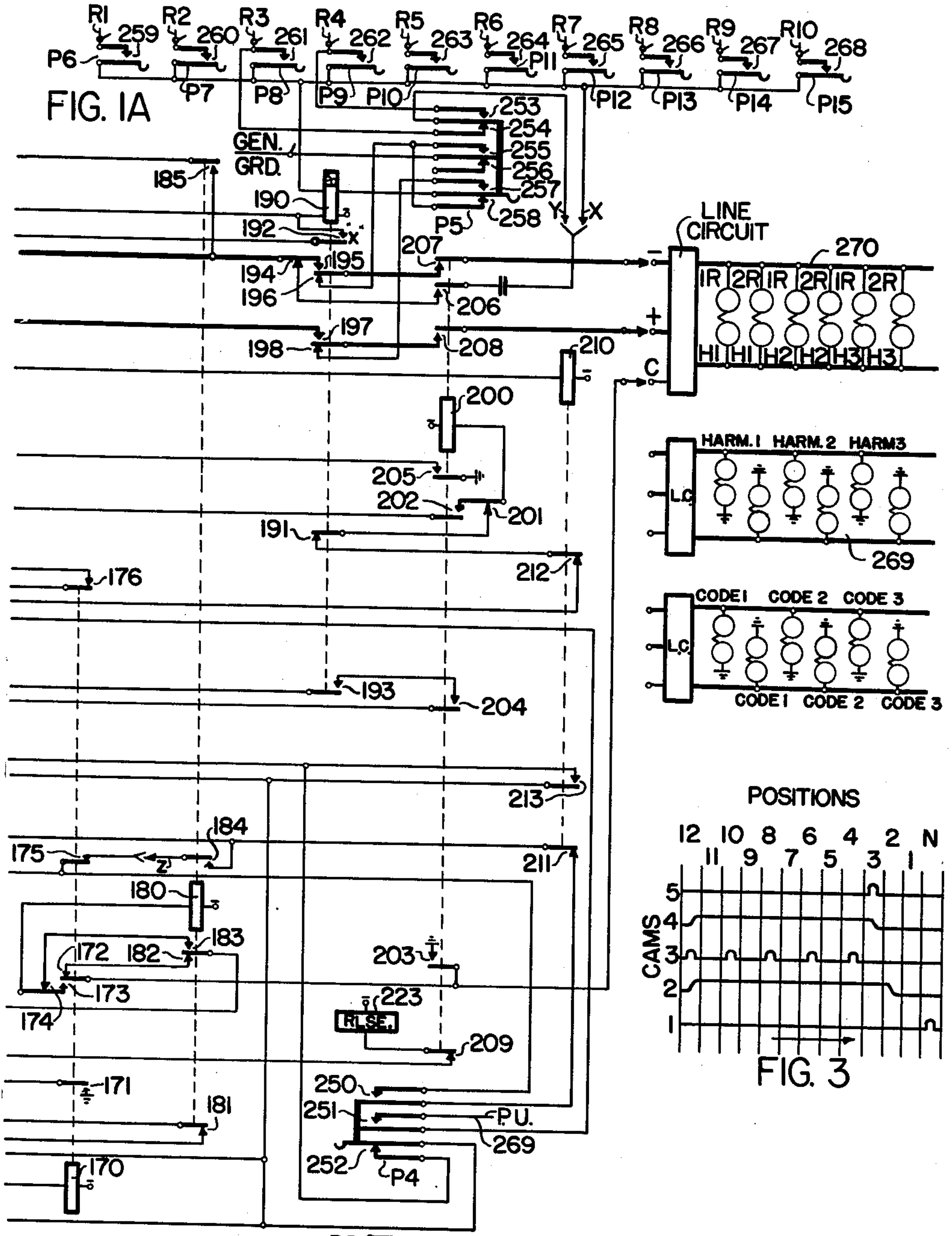

Figs. 1, 1A, 2 and 3, inclusive, show telephone circuits which best illustrate the present invention. More specifically, Figs. 1 and 1A show a combination local and toll party line connector circuit for use in establishing a connection from a local subscriber or a toll operator to a party line subscriber, the circuit including contacts on spring pile-ups P1 to P15, inclusive, of the sequence switch shown in Fig. 2.

Fig. 3 shows the cams of the sequence switch in graphical form. A local party line connector using a sequence switch which doubles as a code selector is shown in an application of C. E. Lomax entitled "Connector Circuit Employing a Sequence Switch," Serial No. 162,209, filed May 16, 1950.

Figure 2:
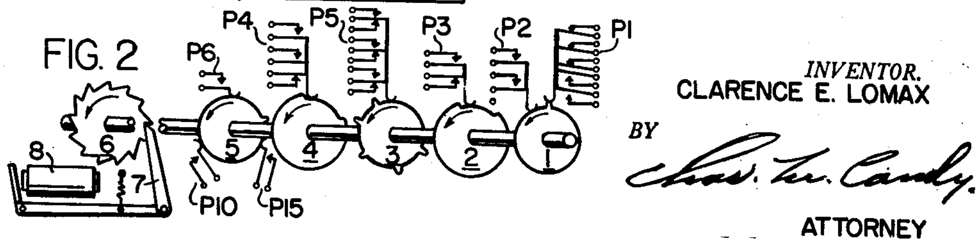

Referring first to Figure 2, the sequence switch shown therein is of the step-by-step pawl driven type, the cams 1 to 5, inclusive, which comprise the switch being fixedly secured on a common shaft to which there is also fixedly attached a ratchet 6 designed to cause the shaft and thus the cams to take thirteen steps to complete one revolution. The ratchet 6 is driven by a pawl 7 controlled by an electromagnet 8, the switch being of the reverse drive type, i. e., the switch will trigger itself on the operation of the magnet and will step on the release of the magnet. There are five cams in the sequence switch shown, the cams being labeled one to five, inclusive, and associated with each cam is one or more spring pile-ups, each pile-up consisting of one or more pairs of springs. The spring pile-ups P1 to P15, inclusive, are associated with their respective cams in predetermined space relationships, the reason for which will become apparent. Only three spring pile-ups are shown associated with cam 5 in the drawing, the remaining seven not being drawn in so as to eliminate crowding. The sequence switch has a normal position which it assumes when the connector circuit is not in use, the switch in Figure 2 being shown in its normal position. Besides the normal position, the switch has twelve other positions or steps thus making a total of thirteen. Certain ones of the spring pile-ups are operated in each position of the sequence switch and certain of the pile-ups are operated more than once in each revolution of the cam. For instance, the pile-up P1 is operated and its contact sets moved to their off-normal position when the sequence switch is in the normal position; pile-up P2 will be operated by cam 1 on the first step of the sequence switch, at which time pile-up P1 will be restored; pile-up P5 will be operated and restored five times in one revolution, at the 4th, 6th, 8th, 10th and 12th positions or steps. It would be just as feasible to provide a greater number of cams so that the spring pile-ups could be in alignment when the sequence switch is constructed, but five cams will adequately serve for the purpose of illustration.

The 100 line combination toll and local connector shown in Figures 1 and 1A is arranged to operate with ten-party party lines having either harmonic ringing or code ringing, the ringers being either divided or bridged on the party lines in a well-known manner. Three types of party lines which may be accessible from this connector are shown, line 269 being of the divided harmonic ringing type, line 270 being of the bridged one ring-two ring harmonic ringing type, and line 271 being of the regular divided code ringing type. The third digit dialed into the connector determines the frequency, or the code, or the frequency and code to apply to the line, depending on the type of ringing used, and the side of the line to which the ringing signal is to be applied.

More particularly, when the ringing system used is divided harmonic, with each odd impulse in the third digit, a different frequency out of five frequencies is selected to be connected to the negative side of the line and with each even impulse a different frequency out of the same five frequencies is selected to be connected to the positive side of the line. When the ringing system used is one ring-two ring bridged harmonic, with a certain five of the impulses in the third digit, five different frequencies are selected all with a one ring code and with the remaining five impulses different ones of the five frequencies are selected all with a two ring code. In this one ring-two ring bridged harmonic ringing system, two subscribers' bells are rung at one time but the one ring-two ring code will distinguish the particular subscriber wanted. When the ringing system used is regular divided code ringing, each odd third digit selects a certain code ring to be applied to the negative side of the line and each even third digit selects a certain code to be applied to the positive side of the line.

*Local call*

We will first consider the operation of this connector circuit in establishing a local call to a subscriber on line 269, the divided harmonic type party line. This party line connector is accessible to a subscriber over a preceding switch train in a well-known manner. This connector is marked idle on the banks of the battery-searching local selectors by the presence of resistance battery on the C terminal of the selector banks by way of contacts 241 of spring pile-up P1, contact 235 on the test jack 234, contacts 176 of relay 170 and contacts 159 of relay 150. This circuit is seized by the searching selector by closing a line loop over the — and + line leads to the two windings of relay 125 by way of contacts 113 and 116 of relay 110 and contacts 133 and 136 of relay 130. Relay 125 operates and closes the circuit of relay 140 at contacts 126. Relay 140 operates, closes the circuit to relay 150 at contacts 141, grounds the C lead at contacts 144 to hold the preceding local switch train under control of this connector circuit and to also mark this circuit as busy in the local selector banks, contacts 144 also connecting ground to the Toll C lead by way of contacts 240 of spring pile-up P1 to mark this connector circuit as busy in the toll selector banks, and prepares the pulsing circuit at contacts 142 from the back contacts of relay 125 to the vertical magnets 220, this pulsing circuit being traceable from back contacts of relay 125 by way of contacts 142, contacts 252 of pile-up P4, and contacts 243 of pile-up P1 to the vertical magnets. Relay 150 operates, closes a point in the all-trunks-busy chain at contacts 160, closes the ringing machine and tone start leads at contacts 161 and 162, respectively, and closes guarding relay 165 in parallel with the vertical magnets at contacts 155, thus connecting the pulsing circuit to guarding relay 165.

When the calling party dials the first digit into this connector, relay 125 follows the loop impulses, repeating these impulses to the vertical magnets 220 and guarding relay 165 by way of the aforementioned pulsing circuit. The vertical magnets follow the first series of impulses and operate to step the Strowger switch shaft in the vertical direction in a well-known manner, the V. O. N. springs operating in a well-known manner on the first vertical step of the shaft to prepare a circuit to the release magnet at contacts 225. Relay 140 is a slow-to-release relay and remains operated during impulsing. Guarding relay 165 operates on the first impulse of the first dialed digit and, also being slow-to-release, remains operated for the duration of the first impulse series. Operation of relay 165 closes the circuit to relay 210 at contact 167 and also closes the circuit to slave relay 170 at contacts 166 by way of contacts 248 of pile-up P3. Slave relay 170 operates, closes relay 180 to the C wiper at contacts 173 and closes the circuit to the sequence switch magnet 222 by way of contacts 152 of relay 150 at contacts 171. Relay 210 operates but at this point performs no function in the operation of the connector.

The sequence switch magnet 222 operates and remains operated during the first series of impulses as do relays 165 and 170. The sequence switch is of the reverse drive type, i. e., it takes one step each time the sequence switch magnet releases after operation, and therefore the sequence switch does not step at this time.

At the termination of the first series of impulses, relay 125 remains steadily operated, the circuit to slow-to-release guarding relay 165 being opened at contacts 127. After a short delay, guarding relay 165 releases, opening the circuits to relays 170 and 210 at contacts 166 and 167, respectively. Relay 210 releases. Slave relay 170 releases, opening the circuit to the sequence switch magnet 222 at contacts 171. Magnet 222 releases and the sequence switch steps from the normal position to the first position causing spring pile-up P1 to release and spring pile-up P2 to operate. Release of pile-up P1 prepares the circuit to the release alarm lead 236, the function of which will subsequently be explained, opens the pulsing circuit to the vertical magnet at contacts 243, and removes ground from the Toll C lead, the Toll C lead still being marked busy to the battery-searching toll selectors by the absence of battery on the Toll C lead due to the open contacts 241 of pile-up P1. Operation of pile-up P2 prepares the pulsing circuit to the rotary magnets 221 and also prepares a circuit to the lower winding of relay 190 from the toll E. C. lead at contacts 246, this particular circuit performing a function only during toll calls. The connector is now prepared to receive a second series of impulses corresponding to a digit transmitted from the dial of the calling subscriber. Relay 125 follows a second series of impulses received over the line loop and this connector circuit operates in the same manner as described for the first digit with the exception that the rotary magnets 221 operate rather than the vertical magnets 220. Relays 165, 170 and 210 are operated as is the sequence switch magnet 222. The rotary magnets pulse to step the Strowger switch wipers to the bank contacts terminating the party line designated by this second digit dialled into the connector.

Assuming that the desired party line is busy, ground will be standing on the C bank contact of the connector and relay 180 will operate immediately by way of contacts 173 of operated relay 170. Operation of relay 180 prepares a locking circuit to itself at contacts 183, closes busy tone to the negative side of the line by way of contacts 124, 185, 115 and 113 to indicate the busy condition of the calling party, and opens the pulsing circuit to the sequence switch magnet 222 at contacts 181 to prevent the stepping of the sequence switch should the calling party dial a third digit. Relay 165 releases, opening the circuits to relays 170 and 210 both of which release. Relay 170 on releasing opens the circuit to the sequence switch magnet 222 at contacts 171 and closes the self-locking circuit to relay 180 by way of contacts 174. The sequence switch magnet releases to step the sequence switch to the second position, thus restoring pile-up P2 and operating pile-up P3. Restoration of pile-up P2 opens a point in the pulsing circuit to the rotary magnet at contacts 247. Operation of pile-up P3 opens a point in the previously traced circuit to slave relay 170 at contacts 248 so that should the calling party dial the third digit even after hearing the busy signal which would cause guarding relay 165 to operate, slave relay 170 would not operate to let the calling party eventually connect with the called line without first releasing the connection and again dialing the entire number.

When the calling party hangs up after receiving the busy signal, the preceding line loop is opened to restore relay 125. Relay 125 opens the circuit to relay 140 and since relay 140 is slow releasing, closes the circuit to relay 165 which operates but performs no function at this time. After a short delay relay 140 releases, opens the circuit to relay 150 at contacts 141, and removes ground from the C lead at contacts 144 to release the preceding switch train, this connector still being held busy by the absence of battery through contacts 241 of pile-up P1 on the C and Toll C leads. Relay 150 releases, closes ground at contacts 153 and by way of contacts 245 of pile-up P1 to the release alarm circuit, opens the locking circuit to relay 180 at contacts 154, and closes the circuit to the release magnet 223 at contacts 157 by way of contacts 127, 143 and the V. O. N. spring contacts 225. Relay 180 releases. The release magnet 223 operates to return the Strowger switch to normal at which time the V. O. N. springs restore to normal and close at contacts 224, a self-interrupting circuit to the sequence switch magnet 222 by way of contacts 127, 143, 157, 224, 244 and 237. The sequence switch magnet 222 operates in a self-interrupting manner to step the sequence switch to the normal position at which time the pile-up P1 operates, opens the self-interrupting circuit to the sequence switch magnet at contacts 244, opens the circuit to the release alarm lead 236 at contacts 245 and closes battery to the C and Toll C lead to mark this connector as idle in the banks of the battery searching local and toll selectors.

It should be noted at this time that if either the Strowger switch shaft or the sequence switch did not return to its normal position within a short period of time after the release alarm lead 236 was grounded, an alarm would be given to indicate this abnormal condition. It should also be noted that the Strowger switch and the sequence switch are restored in tandem and that the release lead 236 is grounded during the restoration of each so that a peg count meter (not shown) connected to lead 236 would have ample time to operate.

Assuming the called party is not busy, battery through the well-known cut-off relay (not shown) of the called line circuit will be standing on the C bank contact and relay 180 will not operate. When relay 170 releases, ground is closed to the C wiper to seize the line circuit and to mark the line as busy on the connector banks. Now that the desired party line has been seized, the calling party will dial the last digit into this connector to select the ringing signal of the desired subscriber on the party line. For the purpose of illustration, assume the last digit dialed is three. Relay 125 follows the last series of dial pulses over the line and repeats them to the sequence switch magnet 222 by way of contacts 127, 142, 252 of pile-up P4, 249 of pile-up P3, and 181. The sequence switch steps three more steps responsive to the three impulses of the last digit. Relay 165 operates on the first impulse and, as before, remains operated for the subsequent impulses in the series. Relay 165 on operating closes the circuit to relay 210 at contacts 167. Relay 210 operates to close a pulsing circuit to the sequence switch magnet 222 at contacts 213 so that the sequence switch magnet will not cease pulsing when the original pulsing circuit to it is opened at contacts 252 when spring pile-up P4 is operated. Spring pile-up P4 operates on the first step of the sequence switch responsive to the last digit and remains operated for the subsequent steps of the sequence switch. Pile-up P4 prepares the circuit from the pick-up lead 269 to relay 200, this circuit at this time being held open by relay 210 at contacts 212, and opens the original pulsing circuit to the sequence switch magnet 222 at contacts 252, the circuit to the sequence switch magnet 222 being held closed by relay 210 at contacts 213.

Responsive to the three impulses in the last digit, the sequence switch steps to the fifth position in which position cam 5 operates spring pile-up P8 and cam 3 leaves pile-up P5 unoperated since even digits cause operation of pile-up P5 and odd digits cause pile-up P5 to be left unoperated.

Shortly after the receipt of the last impulse in the last digit, slow release relay 165 restores, opening the circuit to relay 210 at contacts 167. Relay 210 restores, opens the pulsing circuit to the sequence switch magnet 222 at contacts 213 so that further impulsing can operate no magnets, and closes the pick-up lead 269 to relay 200 by way of contacts 251 of pile-up P4 and contacts 151, 212, 191 and 201. At the beginning of the next cycle of the ringing machine in the exchange, the pick-up lead 269 is momentarily grounded to operated relay 200. Relay 200 locks itself up to relay 150 by way of contacts 202, 121 and 158. Relay 200 opens the pick-up lead 269 at contacts 201, closes the ringing signal on the R3 lead through the upper winding of slow operate relay 190 to the negative side of the line by way of contacts 258 of P5 and contacts 196 and 207, and also closes a ring-back signal to the calling party over the negative side of the line by way of contacts 254 and 206. When regular divided code ringing is employed, X wiring is used so that the calling party will receive ring back tone in the same code as is being used to ring. In this case, however, divided harmonic ringing is needed so Y wiring is used, the ring-back current being taken from lead R3 through contact 254. For divided harmonic ringing, either lead R3 or R4 is used to supply the ring-back current.

When the call is answered by the called party, the line loop is closed through the answering telephone circuit and relay 190 operates through its upper winding from the battery connected to the generator by way of P8, contacts 258 of P5, contacts 196, 207, the line loop, contacts 208, 198, and 256 of P5 to ground. Relay 190 locks up through its lower winding by way of contacts 192, 122 and 205, opens the ring-back circuit at contacts 194 and switches the called line leads through to the two windings of relay 130 at contacts 195 and 197. Relay 130 operates over the called line loop in a well-known manner and reverses the battery through relay 125 on the calling line leads to give a supervisory signal for metering, etc. Relay 130 also connects ground to the winding of relay 150 at contacts 132 to hold this circuit under control of the called party as well as the calling party. Transmission battery is fed to the calling and called parties through relays 125 and 130, respectively.

If the calling party releases from the connection first, relay 125 releases and in turn releases relay 140. Release of relay 140 closes ground to the Supy. lead 230 by way of contacts 127, 143, 156, 193, 204 and 119 to give a signal indicating that one of the parties has released and the other party is holding the connector circuit. Release of relay 140 removes ground from the C lead at contacts 144 to release the preceding switch train. The connector is retained marked as busy in the selector banks since the circuit to the resistance battery is opened at contacts 241 of P1. When the called party then releases, relay 130 releases and opens the circuit to relay 150 at contacts 132. Relay 150 releases, closes the circuit to the release alarm lead at contacts 153, opens the circuit to relay 200 at contacts 158, removes ground from the ringing machine start lead 226 and tone start lead 227 at contacts 161 and 162, respectively, and opens the supervisory lead 230 to extinguish the alarm. Relay 200 releases, removes ground from the C wiper at contacts 203 to release the line circuit, opens the circuit to relay 190 at contacts 205, and closes ground through contacts 127, 143, 157, V. O. N. spring contacts 225 and contact 209 to the Strowger switch release magnet 223. The release magnet 223 operates as previously explained to return the Strowger switch to normal, the sequence switch magnet 222 then operating as previously explained to return the sequence switch to normal.

If the called party had released first, release of the Strowger switch and the sequence switch when the calling party released would take place in a manner similar to that previously explained and the operation will be apparent to one skilled in the art from a brief study of the circuit.

*Toll calls*

We will now consider the operation of this connector circuit in establishing a toll call to a subscriber on line 270, the one ring-two ring bridged harmonic type party line. This connector is marked idle on the banks of the battery searching toll selectors by the presence of resistance battery on the Toll C terminal of the selector banks by way of contacts 241 of spring pile-up P1, contacts 235 of the test jack 234, contacts 176 and 159 and contacts 240 of pile-up P1. This circuit is seized by the searching selector by closing a line loop over the − and + line leads to the two windings of relay 125 by way of contacts 113 and 116 of relay 110 and contacts 133 and 136 of relay 130. The preceding switch train is forwarding ground over the E. C. and Toll C leads and the ground on the Toll C lead immediately grounds lead C to the local selectors by way of contact 240 of pile-up P1 so that this connector is made busy to all the selectors. Relay 125 operates and closes the circuit of relay 140 at contacts 128. Relay 140 operates, closes the circuit to relay 150 at contacts 141, and prepares the pulsing circuit from the back contacts of relay 125 to the vertical magnets 220. Relay 150 operates and closes relay 165 in parallel with the vertical magnets 220 as previously described for a local call. The first digit dialed into this connector causes it to operate in a manner similar to that previously described to elevate the Strowger switch shaft in a vertical direction and also to cause the sequence switch to take one step after the first digit has been received to transfer the pulsing circuit from the vertical magnets 220 to the rotary magnets 221. In addition to the functions described in completing a local call, the operation of spring pile-up P2 after the first series of impulses also closes the lower winding of relay 190 to the E. C. lead at contacts 246. Relay 190 operates to prevent the ringing signal from being applied to the called line automatically immediately after the third digit. This connector functions in the same manner upon receipt of the second digit for rotary selection as it did for a local call except that operation of relay 170 also opens, at contacts 175, a point in the circuit from the Toll C lead to relay 110 so that if relay 180 should operate while the C wiper is passing over a busy bank contact, it cannot cause relay 110 to operate.

Assuming that the desired party line is busy, ground will be standing on the C bank contact of the connector and relay 180 will operate immediately by way of contacts 173 of relay 170. This circuit is arranged so that the calling operator may receive only busy tone or only flash busy or both tone busy and flash busy. If only tone busy is desired, the R and Z wires are omitted. Thus when relay 180 operates it will close tone busy to the −L line. If only flash busy is used on toll calls, the Z wire is used and the R wire is omitted. Under these conditions when relay 170 restores at the end of the second digit, at which time relay 180 is operated, the ground which is being forwarded over the Toll C lead is closed by way of contacts 175 and 184 to relay 110. Relay 110 operates and closes the flash busy impulses over the flash busy lead 232 by way of contacts 123, 165 and 114 to the −L line, relay 110 disconnecting the incoming lines from relay 125 and connecting the negative line to receive the flash impulses. If both flash and tone busy are desired, wires R and Z are both used. Relay 110 will operate as before to return flash busy and the busy interrupter may be so designed that it will apply tone busy during the period flash busy is not being applied.

As stated, operation of relay 110 opens the line circuit to relay 125. Relay 125 restores, opening relay 140. Relay 140 restores and removes ground from relay 150 at contacts 141, relay 150 now being held by relay 110 at contacts 112. When the operator removes her plug to release the connection, ground is removed from the Toll C and E. C. leads. Relay 110 releases, opening the circuit to relay 150 which also releases to return this circuit to normal as previously described.

Assuming that the called line is idle, relay 180 will not be operated and this circuit will function in response to the third digit in a manner similar to that described for a local call to select the proper ringing signal and side of the party line to ring over.

Assume that the third digit dialed is four. The sequence switch takes four steps responsive thereto, moving to the sixth position. Pile-up P4 operates on the first pulse of the third digit and remains operated. At the end of the fourth impulse, spring pile-ups P9 and P5 are operated. Shortly after the receipt of the last impulse, relay 165 restores and opens relay 210. Relay 210 restores, opens the pulsing circuit to the sequence switch magnet 222 at contacts 213 so that further impulsing can operate no magnets, closes relay 110 to the Toll C lead at contacts 211, and prepares the circuit from the pick-up lead (P. U.) to relay 200, this circuit being held open at this time by relay 190 at contacts 191. Relay 110 operates from ground on the Toll C lead, closes a multiple holding circuit to relay 150 at contacts 112, and transfers the incoming line from relay 125 through to contacts 207 and 208 at contacts 114 and 118. Relay 125 restores and opens relay 140. Relay 140 restores, opens one of the multiple holding circuits to relay 150 at contacts 141, relay 150 being held by relay 110, and removes ground at contacts 144 from the C lead, the switch being marked busy by an absence of battery on the C leads.

The equipment is now ready to ring the called party but before this can be done, relay 190 must restore so that the ground signals on the P. U. lead can operate relay 200 which is a combination pick-up and wiper switching relay. Since delayed ringing is wanted by certain operators and not by others, the release of relay 190 may be by the ringing key at the toll board or it may be by the toll transmission repeater (not shown) doing it automatically. In any case, relay 190 is released by removing ground from the E. C. lead.

Relay 190, on releasing, opens the holding circuit to itself at contacts 192 to prevent reoperation of itself over the E. C. lead and closes relay 200 to the P. U. lead at contacts 191. Relay 200 operates on a ground pulse over the P. U. lead at the beginning of the next ringing cycle, locks up to the E. C. lead at contacts 202 and closes ringing current over the R5 lead and through the upper winding of relay 190, contacts 257, 198 and 208, through the called subscribers' ringers responsive to the particular ringing frequency, contacts 207, 196 and 255 to ground. Two of the ringers of line 270 ring but the 1 or 2 ring code determines the particular subscriber wanted. Since one ring-two ring bridged harmonic ringing is used, Y wiring is needed, since leads R3 and R4 both have the same cycle ringing current connected to them, one having a one ring code and the other having a two ring code. Thus the calling party will receive ring-back tone in a one or two ring code identical to the code of the called party.

When the call is answered, the line loop through the called substation is closed to operate relay 190. Relay 190 locks up to the E. C. lead, closes the line through to the called party, transmission battery being furnished in the transmission repeaters (not shown), and opens the ringing circuit.

After the called party hangs up, the operator may release the connection by removing her plug to cause release of relays 110, 190 and 200. Release relay 110 causes relay 150 to release. This circuit then returns to normal in the same manner as previously described.

This invention is not limited to party line connectors or connectors in general, but applies equally well to similarly functioning telephone switching circuits. Numerous uses and adaptations of this invention will occur to those versed in the art and all changes and modifications coming within the scope of the appended claims are embraced thereby.

What is claimed is:

1. In a connector circuit accessible from a local subscriber over a group of incoming local conductors and from a toll operator over a group of incoming toll conductors, a ring cut-off relay, a ringing circuit, means for opening said ringing circuit, means for controlling last said means by operation of said ring cut-off relay, a plurality of groups of outgoing line terminal sets, selecting means, means for operating said selecting means to first cause the selection of one particular group of said plurality of groups of sets and then the selection of one particular set in said selected group of sets, means whereby said last-named means is operated over either of said sets of incoming conductors, a sequence switch, contacts operated by said sequence switch, means for operating said sequence switch, means whereby said last means is operated after said group selection and before said terminal set selection to thereby operate said contacts, an operating circuit for said ring cut-off relay including said contacts and one of said incoming toll conductors, said operating circuit completed to said ring cut-off relay only when said connector circuit is seized over said incoming toll conductors.

2. In a switching circuit accessible over a plurality of groups of incoming line conductors, a first and second operating means for said switching circuit, a ring cut-off relay, an operating circuit for said ring cut-off relay including one of the conductors of only one of said groups of line conductors, a pulsing circuit connected to the first operating means, means for transmitting series of impulses over said circuit, means whereby said first operating means is operated by the first series of impulses transmitted over said circuit, a selecting means, means for operating said selecting means, means whereby said last means is operated after the operation of said first operating means to transfer said pulsing circuit from said first to said second operating means, means whereby said second operating means is operated by the second series of pulses transmitted over said pulsing circuit, means whereby the operating means of said selecting means is then operated to cause the transfer of said pulsing circuit to said operating means of said selecting means, and means whereby said selecting means is caused to be operated by the next series of impulses over said pulsing circuit to complete the operating circuit of said ring cut-off relay over said one conductor.

3. In a switching circuit accessible over a plurality of groups of incoming line conductors, a first and second operating means for said switching circuit, a ring cut-off relay, an operating circuit for said ring cut-off relay including one of the conductors of only one of said groups of incoming line conductors, a pulsing circuit connected to said first operating means, means for transmitting series of pulses over said circuit, means whereby said first operating means is operated by the first series of pulses transmitted over said circuit, a selecting means, a plurality of switching means controlled by said selecting means, means for operating said selecting means, means whereby said last-named means is operated after the operation of said first operating means causing operation of certain of said switching means to transfer said pulsing circuit from said first to said second operating means, means whereby said second operating means is operated by the second series of pulses transmitted over said pulsing circuit, means whereby the operating means of said selecting means is then operated causing operation of certain of said switching means to transfer said pulsing means to said operating means of said selecting means, and and means whereby said operating means is operated by the next series of pulses over said pulsing circuit causing operation of certain others of said switching means to complete the operating circuit of said ring cut-off relay over said one conductor.

4. In a telephone system, a selecting switch having wipers and primary and secondary operating magnets for moving the wipers in a primary and secondary movement to select an outlet accessible to the wipers, an impulsing circuit and means for transmitting series of impulses thereover, a relay, a sequence switch having switching contacts controlled thereby, certain of said contacts connecting said impulsing circuit to the primary magnet to cause operation thereof by the first series of said impulses thereover, means whereby said relay is also operated over said impulsing circuit by said first series of impulses, means for operating said sequence switch, means controlled by the operation of said relay for operating said last means to cause said sequence switch to operate certain of its contacts to transfer said pulsing circuit to the secondary operating magnet, whereby said secondary magnet is operated by a second series of said impulses over said impulsing circuit to select the desired outlet, said relay again controlled over said circuit to again operate said sequence switch to operate certain other of said contacts, said last operated contacts preventing further operation of said relay and transferring said pulsing circuit to the operating means of said sequence switch.

5. In a telephone system, a selecting switch, a plurality of groups of outlets accessible to said switch, means for operating said selecting switch to select a group of outlets and means for operating said selecting switch to select an outlet in the selected group, a sequence switch including an operating magnet, impulsing means, an impulsing circuit controlled by said impulsing means, means whereby said impulsing means is operated to control said impulsing circuit to operate said first means to select the group and is then operated to control said impulsing circuit to operate said second means to select an outlet in the group, a guard relay, means whereby said guard relay is operated over said impulse circuit, spring contacts normally held closed by said sequence switch, a slave relay, a circuit for operating said slave relay including said spring contacts, means including contacts operated by said guard relay for completing said circuit, a circuit for operating said sequence switch operating magnet, and means controlled by the operation of said slave relay for completing the said circuit of said sequence switch operating magnet to thereby cause operation of said sequence switch, said operation of the sequence switch causing the opening of said spring contacts to prevent further operation of said slave relay.

6. In a telephone circuit, a selecting switch comprising a control wiper and primary and secondary magnets for moving the wiper, a plurality of groups of outlets accessible to said wiper, a sequence switch including an operating magnet, a circuit including a relay for operating said sequence switch magnet, a pulsing means, means whereby said pulsing means is operated to transmit a first series of pulses to said primary magnet to cause said wiper to select a group of outlets, means for closing said circuit including said relay to operate said sequence switch magnet once after transmission of said first series of pulses, means whereby operation of said sequence switch causes a second series of transmitted pulses from said pulsing means to be received by said secondary magnet to cause said wiper to contact a particular outlet in the selected group, means for closing said circuit including a relay in order to operate said sequence switch magnet once again after transmission of said second series of pulses, means whereby said second operation of said sequence switch causes a third series of transmitted pulses from said pulsing means to be received by said sequence switch magnet and, additionally, renders said circuit including said relay ineffective to further control said sequence switch, a control circuit, including break contacts on said relay and said wiper, and means whereby said control circuit is closed responsive to the disabling of said relay.

7. In a selecting switch circuit for extending telephone connections to one of a plurality of outlets, a connector switch having contact wipers and primary and secondary magnets for moving the wipers to select an outlet, an impulse circuit over which series of impulses are transmitted to the said magnets to move the said wipers, a sequence switch, driving means therefor, a relay, means whereby said relay is operated over said impulse circuit after operation of the primary magnet by the first series of impulses thereover, means to operate said driving means to move said sequence switch in a first step, means whereby said last-mentioned means is controlled by operation of said relay, switching means to transfer said impulse circuit from the primary to the secondary magnet, means whereby said last-mentioned switching means is controlled by said first step of said sequence switch, means whereby said relay is again operated to cause a step of said sequence switch, means whereby said last-mentioned means is controlled responsive to the second series of impulses over said impulse circuit, means for preventing further control of said relay over said impulse circuit, means whereby said last-mentioned means is controlled by said second step of said sequence switch, a circuit for said sequence switch driving means completed to said impulse circuit by said last means, means whereby a succeeding series of impulses over said impulse circuit causes a step by step operation of said driving means, a control circuit for seizing a selected outlet through said control wiper, means whereby said control circuit is closed in response to the disabling of said relay, a second relay operative to connect said selecting switch circuit to said wipers, means for operating said second relay, and means whereby said last-mentioned means is operated in response to the operation of said sequence switch.

References Cited in the file of this patent

UNITED STATES PATENTS

| Number | Name | Date |
|---|---|---|
| 1,227,609 | Goodrum | May 29, 1917 |
| 1,604,550 | Deakin | Oct. 26, 1926 |
| 2,515,783 | Lomax | July 18, 1950 |